US010938503B2

(12) United States Patent
Vu (10) Patent No.: US 10,938,503 B2
(45) Date of Patent: Mar. 2, 2021

(54) VIDEO CODEC DATA RECOVERY TECHNIQUES FOR LOSSY WIRELESS LINKS

(71) Applicant: Advanced Micro Devices, Inc., Sunnyvale, CA (US)

(72) Inventor: Ngoc Vinh Vu, Cupertino, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 15/852,833

(22) Filed: Dec. 22, 2017

(65) Prior Publication Data

US 2019/0199467 A1 Jun. 27, 2019

(51) Int. Cl.
*H04L 1/00* (2006.01)
*H04N 19/85* (2014.01)
*H04N 19/51* (2014.01)
*G06T 11/60* (2006.01)
*H04B 7/06* (2006.01)

(52) U.S. Cl.
CPC .......... *H04L 1/0003* (2013.01); *H04L 1/0009* (2013.01); *H04L 1/0011* (2013.01); *H04L 1/0017* (2013.01); *H04N 19/51* (2014.11); *H04N 19/85* (2014.11); *G06T 11/60* (2013.01); *H04B 7/0617* (2013.01)

(58) Field of Classification Search
CPC ............... H04L 43/0894; H04L 43/065; H04L 43/0811; H04L 43/106; H04L 45/02
See application file for complete search history.

(56) References Cited

U.S. PATENT DOCUMENTS

| 5,335,010 A | 8/1994 | Lindemeier et al. |
| 5,818,543 A | 10/1998 | Lee |

(Continued)

FOREIGN PATENT DOCUMENTS

| WO | WO-2009156366 A1 * | 12/2009 | ..... H04N 21/234327 |
| WO | 2011087905 | 7/2011 | |

OTHER PUBLICATIONS

International Search Report and Written Opinion in International Application No. PCT/US2018/052373, dated Jan. 7, 2019, 13 pages.

(Continued)

*Primary Examiner* — Christopher B Robinson
(74) *Attorney, Agent, or Firm* — Kowert Hood Munyon Rankin and Goetzel PC; Rory D. Rankin (57) ABSTRACT

Systems, apparatuses, and methods for implementing data recovery techniques for lossy wireless links are disclosed. A transmitter is configured to encode a video stream and wirelessly transmit the encoded video stream to a receiver, with the video stream representing a virtual reality (VR) rendered environment. The transmitter partitions the video stream into a plurality of substream components based on frequency. Motion vector parameters are calculated for the lowest frequency substream component of the video stream only, and the motion vector parameters are sent to the receiver using a low MCS level. When the receiver receives the motion vector parameters, but the receiver does not receive the lowest frequency component of a given chunk, the receiver uses the motion vector parameters to reconstruct the lowest frequency component of the given chunk by extrapolating from a corresponding chunk of the previous video frame.

17 Claims, 10 Drawing Sheets

(56) References Cited

U.S. PATENT DOCUMENTS

| | | | |
|---|---|---|---|
| 5,860,056 A | 1/1999 | Pond | |
| 6,414,960 B1 | 7/2002 | Kuhn et al. | |
| 7,479,981 B2 | 1/2009 | Tierney et al. | |
| 7,596,359 B2 | 9/2009 | Kimoto et al. | |
| 7,715,634 B2 | 5/2010 | Lei et al. | |
| 7,881,258 B2 | 2/2011 | Gilbert et al. | |
| 8,300,563 B2 | 10/2012 | Rishnaswamy et al. | |
| 8,365,238 B2 | 1/2013 | Reznic et al. | |
| 8,422,961 B2 | 4/2013 | Kafle | |
| 8,457,026 B1 | 6/2013 | Ho et al. | |
| 8,976,220 B2 | 3/2015 | Maxwell | |
| 9,450,620 B1 | 9/2016 | Ahmed et al. | |
| 9,716,537 B2 | 7/2017 | Mammoser et al. | |
| 9,786,985 B2 | 10/2017 | Kim et al. | |
| 9,799,954 B2 | 10/2017 | Preradovic et al. | |
| 9,948,413 B1 | 4/2018 | Zhou et al. | |
| 10,312,980 B2 | 6/2019 | Maamari et al. | |
| 2003/0072376 A1 | 4/2003 | Krishnamachari et al. | |
| 2004/0081238 A1* | 4/2004 | Parhy | H04N 19/51 375/240.16 |
| 2004/0196919 A1 | 10/2004 | Mehta et al. | |
| 2004/0204103 A1 | 10/2004 | Rouphael | |
| 2005/0185097 A1 | 8/2005 | Takatori et al. | |
| 2006/0017843 A1* | 1/2006 | Shi | H04N 5/145 348/441 |
| 2006/0209890 A1 | 9/2006 | MacMullan et al. | |
| 2006/0209892 A1 | 9/2006 | MacMullan et al. | |
| 2006/0212911 A1 | 9/2006 | MacMullan et al. | |
| 2007/0147492 A1* | 6/2007 | Marquant | H04N 19/34 375/240.1 |
| 2007/0223380 A1 | 9/2007 | Gilbert et al. | |
| 2008/0064425 A1 | 3/2008 | Kim et al. | |
| 2008/0088635 A1 | 4/2008 | Callway et al. | |
| 2008/0144713 A1* | 6/2008 | Kimmich | H04N 19/66 375/240.02 |
| 2009/0150943 A1 | 6/2009 | Vasudevan et al. | |
| 2009/0213940 A1* | 8/2009 | Steinbach | H04N 19/176 375/240.27 |
| 2010/0009635 A1 | 1/2010 | Qin et al. | |
| 2010/0150252 A1 | 6/2010 | Camp, Jr. et al. | |
| 2010/0214169 A1 | 8/2010 | Kafle | |
| 2011/0058104 A1 | 3/2011 | Arai | |
| 2011/0070928 A1 | 3/2011 | Hsu et al. | |
| 2011/0129025 A1* | 6/2011 | Jaeckel | H03M 13/356 375/260 |
| 2011/0151790 A1 | 6/2011 | Khandekar et al. | |
| 2011/0286545 A1 | 11/2011 | Guignard et al. | |
| 2012/0276896 A1* | 11/2012 | Ren | H04L 1/0009 455/423 |
| 2012/0327115 A1 | 12/2012 | Chhetri et al. | |
| 2013/0115887 A1 | 5/2013 | Kwon et al. | |
| 2013/0242117 A1 | 9/2013 | Luo et al. | |
| 2014/0010319 A1 | 1/2014 | Baik et al. | |
| 2014/0126620 A1 | 5/2014 | Maltsev et al. | |
| 2014/0266900 A1* | 9/2014 | Kasher | H04W 16/28 342/372 |
| 2014/0269937 A1 | 9/2014 | Wadsworth et al. | |
| 2014/0368667 A1 | 12/2014 | Peterson et al. | |
| 2015/0110167 A1* | 4/2015 | Chen | H04N 19/70 375/240.01 |
| 2015/0289147 A1 | 10/2015 | Lou et al. | |
| 2015/0333994 A1 | 11/2015 | Gell et al. | |
| 2015/0341646 A1 | 11/2015 | Sze et al. | |
| 2016/0105229 A1 | 4/2016 | Trainin et al. | |
| 2016/0134485 A1 | 5/2016 | Thapliya et al. | |
| 2016/0149633 A1 | 5/2016 | Sanderovich et al. | |
| 2016/0227432 A1 | 8/2016 | Freeman et al. | |
| 2016/0301770 A1 | 10/2016 | Marra et al. | |
| 2016/0337150 A1 | 11/2016 | Larsson et al. | |
| 2017/0026263 A1 | 1/2017 | Gell et al. | |
| 2017/0127408 A1 | 5/2017 | Du | |
| 2017/0134076 A1 | 5/2017 | Maamari et al. | |
| 2017/0141885 A1 | 5/2017 | Bontu et al. | |
| 2017/0156067 A1 | 6/2017 | Huang | |
| 2017/0187437 A1 | 6/2017 | Cariou et al. | |
| 2017/0207839 A1 | 7/2017 | Eitan et al. | |
| 2017/0222704 A1 | 8/2017 | Eitan et al. | |
| 2017/0251484 A1 | 8/2017 | Negus et al. | |
| 2017/0264350 A1 | 9/2017 | Sanderovich et al. | |
| 2018/0062719 A1 | 3/2018 | Verma et al. | |
| 2018/0074188 A1 | 3/2018 | Polo et al. | |
| 2018/0093177 A1 | 4/2018 | Tokubo | |
| 2018/0123901 A1 | 5/2018 | Yermakov et al. | |
| 2018/0137412 A1 | 5/2018 | Nikkhah et al. | |
| 2018/0198506 A1 | 7/2018 | Sanderovich et al. | |
| 2018/0199256 A1 | 7/2018 | Sanderovich et al. | |
| 2018/0205423 A1 | 7/2018 | Sanderovich et al. | |
| 2018/0227027 A1 | 8/2018 | Kasher et al. | |
| 2018/0234860 A1 | 8/2018 | Kasher et al. | |
| 2018/0248603 A1 | 8/2018 | Kasher et al. | |
| 2018/0288635 A1 | 10/2018 | Kaushik et al. | |
| 2019/0036572 A1 | 1/2019 | Kasher et al. | |
| 2019/0068473 A1 | 2/2019 | Vu et al. | |
| 2019/0068926 A1 | 2/2019 | Vu et al. | |
| 2019/0101638 A1 | 4/2019 | Vu et al. | |
| 2019/0104276 A1 | 4/2019 | Vu et al. | |
| 2019/0104458 A1 | 4/2019 | Svennebring et al. | |
| 2019/0158156 A1 | 5/2019 | Da Silva et al. | |
| 2019/0173544 A1 | 6/2019 | Vu et al. | |
| 2019/0215256 A1 | 7/2019 | Dhanabalan et al. | |
| 2019/0230185 A1 | 7/2019 | Dhanabalan et al. | |
| 2019/0261209 A1 | 8/2019 | Balasubramanian et al. | |

OTHER PUBLICATIONS

Non-Final Office Action in U.S. Appl. No. 15/686,927, dated Nov. 1, 2017, 16 pages.

Final Office Action in U.S. Appl. No. 15/686,927, dated Feb. 27, 2018, 15 pages.

Non-Final Office Action in U.S. Appl. No. 15/686,927, dated Aug. 8, 2018, 19 pages.

Final Office Action in U.S. Appl. No. 15/686,927, dated Jan. 17, 2019, 17 pages.

Non-Final Office Action in U.S. Appl. No. 15/686,934, dated Jan. 25, 2019, 8 pages.

Non-Final Office Action in U.S. Appl. No. 15/832,448, dated Feb. 1, 2019, 15 pages.

International Search Report and Written Opinion in International Application No. PCT/US2018/052350, dated Dec. 14, 2018, 13 pages.

Van Der Schaar et al., "Robust Transmission of MPEG-4 Scalable Video Over 4G Wireless Networks", International Conference on Image Processing, Sep. 22, 2002, pp. 757-760, vol. 3, IEEE.

Non-Final Office Action in U.S. Appl. No. 15/686,927, dated Jun. 11, 2019, 12 pages.

Non-Final Office Action in U.S. Appl. No. 15/721,125, dated Feb. 20, 2019, 9 pages.

Final Office Action in U.S. Appl. No. 15/721,125, dated Sep. 10, 2019, 9 pages.

Final Office Action in U.S. Appl. No. 15/832,448, dated Sep. 30, 2019, 18 pages.

Final Office Action in U.S. Appl. No. 15/686,927, dated Oct. 2, 2019, 7 pages.

Final Office Action in U.S. Appl. No. 15/686,934, dated Oct. 16, 2019, 9 pages.

Non-Final Office Action in U.S. Appl. No. 15/686,927, dated Jan. 7, 2020, 10 pages.

Non-Final Office Action in U.S. Appl. No. 15/721,125, dated Jan. 7, 2020, 10 pages.

Non-Final Office Action in U.S. Appl. No. 15/832,448, dated Apr. 15, 2020, 18 pages.

Final Office Action in U.S. Appl. No. 15/832,448, dated Oct. 28, 2020, 19 pages.

* cited by examiner

VIDEO CODEC DATA RECOVERY TECHNIQUES FOR LOSSY WIRELESS LINKS

BACKGROUND

Description of the Related Art

A wireless communication link can be used to send a video stream from a computer (or other device) to a virtual reality (VR) headset (or head mounted display (HMD)). Transmitting the VR video stream wirelessly eliminates the need for a cable connection between the computer and the user wearing the HMD, thus allowing for unrestricted movement by the user. A traditional cable connection between a computer and HMD typically includes one or more data cables and one or more power cables. Allowing the user to move around without a cable tether and without having to be cognizant of avoiding the cable creates a more immersive VR system. Sending the VR video stream wirelessly also allows the VR system to be utilized in a wider range of applications than previously possible.

However, a VR application is a low latency application which does not typically buffer video data. For example, when the user moves their head, this is detected by the HMD or console, and then the subsequently rendered video frames are updated to reflect the new viewing position of the user. Additionally, changing conditions of the link can affect video quality. When the link deteriorates and video data is lost or corrupted, this can result in a poor user experience. Accordingly, improved techniques for wireless streaming of data are desired.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for implementing data recovery techniques for lossy wireless links are disclosed herein. In one embodiment, a wireless communication system includes a transmitter and a receiver (e.g., head-mounted display (HMD)) communicating over a wireless link. In one embodiment, the transmitter is configured to encode a video stream and wirelessly transmit the encoded video stream to the receiver. In one embodiment, the video stream represents a virtual reality (VR) rendered environment.

In one embodiment, when video data is transmitted wirelessly, the transmitter transmits a low resolution component only to the receiver. The low resolution component can also be referred to as a low frequency component or DC component. This low resolution component is transmitted with a robust, low modulation coding scheme (MCS) level. Accordingly, there is a high probability that the low resolution component is received over a challenging link. Also, motion estimation data (e.g., motion vector parameters) is calculated for the DC component only. This makes the motion estimation data much smaller than it would be if calculated for the entire original video frame. In one embodiment, the motion estimation data is transferred to the receiver using an even lower MCS level (e.g., MCS level 0) than the MCS level that was used for the low resolution component. Whenever MCS 0 is used to communicate with the receiver, such as during beamforming, the motion estimation data of the DC component is embedded in the signal. When the HMD receives the motion estimation data, but the HMD does not receive the DC component, the HMD uses the motion estimation data to extrapolate the current DC component from the previous video frame. This enables the HMD to reconstruct a lost data chunk, not in high detail, but roughly so that the user does not notice the lost chunk.

Since the motion estimation data is generated from the low resolution component, which reduces the size of the motion estimation data, this motion estimation data can be embedded in a beamforming transaction or an acknowledgement (ACK) transaction. These transactions are normally transferred using MCS 0 and are robust to the link condition. The beamforming and ACK transactions are sent at MCS 0 because this gives them the highest chance of being received by the HMD. And when the motion estimation data is embedded in these transactions, the motion estimation data has a high probability of being received by the HMD. Alternatively, the motion estimation data can be sent in its own MCS 0 transaction. In one embodiment, if the motion estimation data is small enough (i.e., less than a threshold), then the motion estimation data is sent with other transactions.

In one embodiment, if the motion estimation data is lost, the HMD can perform a motion estimation data flow extrapolation. For example, if the HMD receives the motion estimation data for the previous two frames, and if the flow moves in a certain direction, the HMD extrapolates along the detected direction to regenerate the lost motion estimation data of the current frame. In this example, the HMD predicts that the next motion vector will be in the same direction as the previous motion vectors. Then, the HMD can recover the low frequency component from the regenerated motion estimation data.

In another embodiment, if one wireless packet is lost, this typically corresponds to a small portion of a video frame. For example, one packet may include 0.1% of the entire frame if 1000 packets are sent for the entire video frame. When reconstructing a lost chunk of the frame, that piece does not always have to be reconstructed at a high resolution. A low resolution reconstruction of the lost chunk will typically not generate a noticeable flaw or artifact for the user. But if the chunk is lost and is displayed using a black box, then the user will notice this flaw in the video frame. In a further embodiment, techniques are utilized to mitigate the scenario when a high resolution component of only one small piece of the video frame is lost. If the low frequency component of that small piece is received, and if the high resolution components surrounding that small piece are received, then the HMD can extrapolate using the neighboring high resolution components as well as the low resolution component of the lost chunk to regenerate the lost high resolution component.

Figure 1:
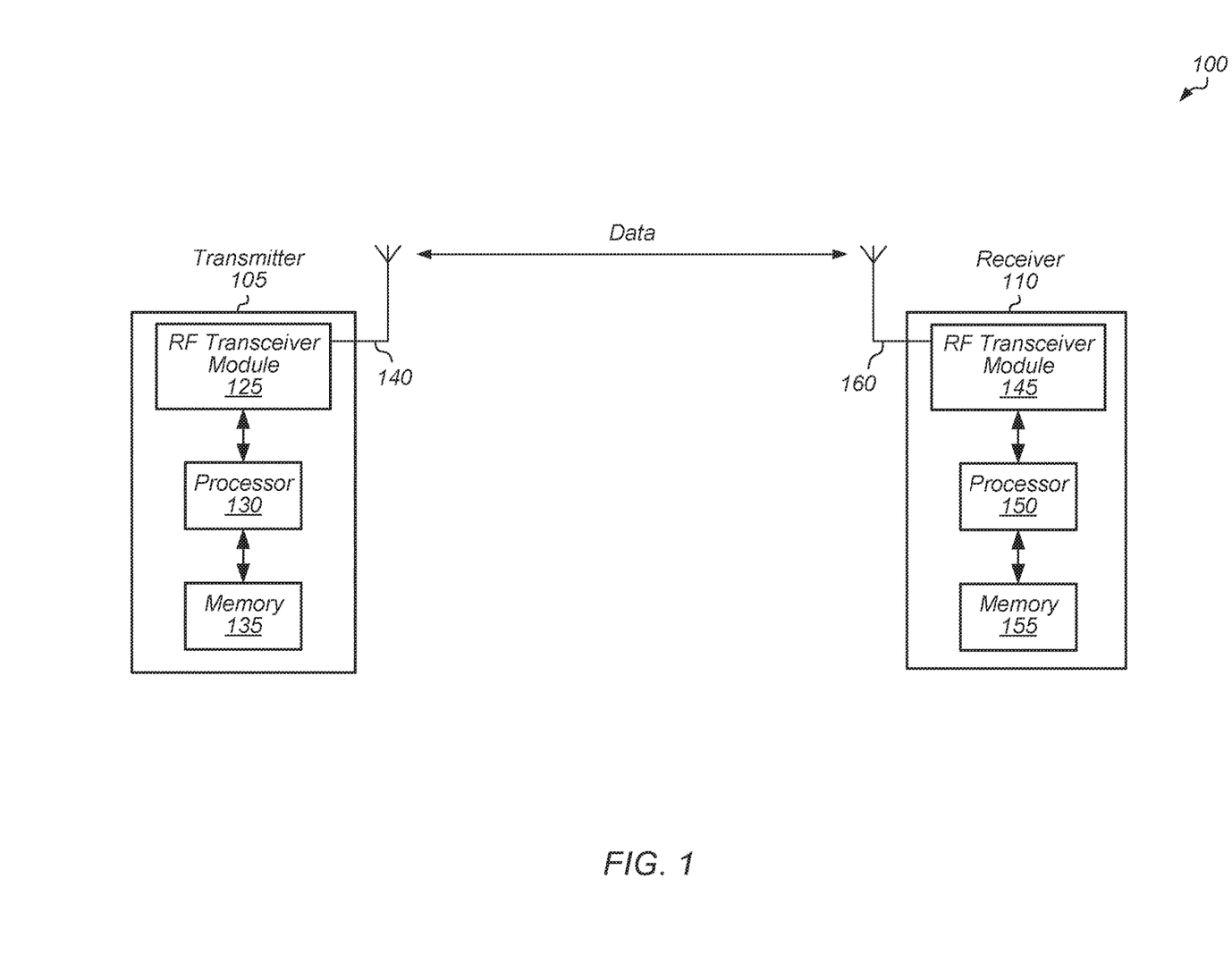
FIG. 1 is a block diagram of one embodiment of a system.

Referring now to FIG. 1, a block diagram of one embodiment of a system 100 is shown. System 100 includes at least a first communications device (e.g., transmitter 105) and a second communications device (e.g., receiver 110) operable to communicate with each other wirelessly. It is noted that receiver 110 can also transmit data and/or acknowledgments to transmitter 105. Accordingly, transmitter 105 and receiver 110 can also be referred to as transceivers. In one embodiment, transmitter 105 and receiver 110 communicate wirelessly over the unlicensed 60 Gigahertz (GHz) frequency band. For example, transmitter 105 and receiver 110 can communicate in accordance with the Institute of Electrical and Electronics Engineers (IEEE) 802.11ad standard (i.e., WiGig). In other embodiments, transmitter 105 and receiver 110 can communicate wirelessly over other frequency bands and/or by complying with other wireless communication standards.

Wireless communication devices that operate within extremely high frequency (EHF) bands, such as the 60 GHz frequency band, are able to transmit and receive signals using relatively small antennas. However, such signals are subject to high atmospheric attenuation when compared to transmissions over lower frequency bands. In order to reduce the impact of such attenuation and boost communication range, EHF devices typically incorporate beamforming technology. For example, the IEEE 802.11ad specification details a beamforming training procedure, also referred to as sector-level sweep (SLS), during which a wireless station tests and negotiates the best transmit and/or receive antenna combinations with a remote station. In various embodiments, transmitter 105 and receiver 110 are configured to perform periodic beamforming training procedures to determine the optimal transmit and/or receive antenna combinations for wireless data transmission.

Transmitter 105 and receiver 110 are representative of any type of communication devices and/or computing devices. For example, in various embodiments, transmitter 105 and/or receiver 110 can be a mobile phone, tablet, computer, server, television, game console, head-mounted display (HMD), another type of display, router, or other types of computing or communication devices. In various embodiments, system 100 is configured to execute latency sensitive applications. For example, in one embodiment, system 100 executes a virtual reality (VR) application for wirelessly transmitting frames of a rendered virtual environment from transmitter 105 to receiver 110. In other embodiments, other types of latency sensitive applications can be implemented by system 100 that take advantage of the methods and mechanisms described herein.

In one embodiment, transmitter 105 includes at least radio frequency (RF) transceiver module 125, processor 130, memory 135, and antenna 140. RF transceiver module 125 is configured to transmit and receive RF signals. In one embodiment, RF transceiver module 125 is a mm-wave transceiver module operable to wirelessly transmit and receive signals over one or more channels in the 60 GHz band. RF transceiver module 125 converts baseband signals into RF signals for wireless transmission, and RF transceiver module 125 converts RF signals into baseband signals for the extraction of data by transmitter 105. It is noted that RF transceiver module 125 is shown as a single unit for illustrative purposes. It should be understood that RF transceiver module 125 can be implemented with any number of different units (e.g., chips) depending on the embodiment. Similarly, processor 130 and memory 135 are representative of any number and type of processors and memory devices, respectively, that can be implemented as part of transmitter 105.

Transmitter 105 also includes antenna 140 for transmitting and receiving RF signals. Antenna 140 represents one or more antennas, such as a phased array, a single element antenna, a set of switched beam antennas, etc., that can be configured to change the directionality of the transmission and reception of radio signals. As an example, antenna 140 includes one or more antenna arrays, where the amplitude or phase for each antenna within an antenna array can be configured independently of other antennas within the array. Although antenna 140 is shown as being external to transmitter 105, it should be understood that antenna 140 can be included internally within transmitter 105 in various embodiments. Additionally, it should be understood that transmitter 105 can also include any number of other components which are not shown to avoid obscuring the figure. Similar to transmitter 105, the components implemented within receiver 110 include at least RF transceiver module 145, processor 150, memory 155, and antenna 160, which are similar to the components described above for transmitter 105. It should be understood that receiver 110 can also include or be coupled to other components (e.g., a display).

The link between transmitter 105 and receiver 110 has capacity characteristics that fluctuate with variations in the environment. In various embodiments, transmitter 105 is configured to split the video stream into a plurality of substream components, with each substream component corresponding to a separate frequency range of the video stream. The technique utilized by the transmitter for splitting the video stream into a plurality of components can vary from embodiment to embodiment. In one embodiment, the transmitter utilizes successive compression to split the video stream into a lower quality substream and one or more successively higher quality substreams. The number of higher quality substreams can vary according to the embodiment. Each higher quality substream will require the successful reception of all of the lower quality substreams to be successfully decoded. The higher quality substreams are effectively incremental enhancements to the lower quality substreams. It is noted that a "lower quality" substream can also be referred to as a "lower frequency" substream. Similarly, a "higher quality" substream can also be referred to as a "higher frequency" substream. It is also noted that the term "substream" can also be used interchangeably with "component", "stream", "elements", or "subset bitstream" in relation to the above terms.

Transmitter 105 can send the substream components separately to receiver 110, and utilize different modulation coding scheme (MCS) levels for the different substream components. In one embodiment, transmitter 105 utilizes a relatively low MCS level for sending the lowest frequency substream component of the video stream to help increase the probability that this lowest frequency substream component is received by receiver 100.

However, in some cases, even the lowest frequency substream component of the video stream can be lost during transmission due to poor channel conditions. Accordingly, to mitigate this scenario, transmitter 105 is configured to calculate motion estimation data (e.g., motion vector parameters) from the lowest frequency substream component only, and then send this motion estimation data to receiver 110 using a low, robust MCS level. In one embodiment, transmitter 105 uses a MCS level for the motion estimation data which is lower than the MCS level utilized for the lowest frequency substream component. Since the motion estimation data is calculated from the lowest frequency substream component only, the motion estimation data tends to be small. In one embodiment, if the size of the motion estimation data is less than a threshold, then the motion estimation data is embedded in a beamforming or acknowledgement (ACK) transaction. A beamforming transaction is typically sent using MCS level 0, increasing the probability of the transaction being received correctly.

Any of various techniques can be utilized for generating the motion estimation data for the lowest frequency substream component only. For example, in one embodiment, the motion estimation data can include a global motion vector for a video frame and local motion vectors for portions of the video frame. Global motion generally describes the motion of the entire video frame, such as motion caused by camera panning, tiling, zooming in or out, rotation, or other actions. As used herein, the term "motion vector" is defined as a two-dimensional vector specifying an offset from the coordinates of at least a portion of a given video frame to the coordinates of the portion in a reference frame. For example, in one embodiment, a local motion vector is represented as a set of x and y coordinates which indicate the horizontal and vertical motion of a block (e.g., macroblock) between two video frames.

In one embodiment, if the receiver 110 does not receive the lowest frequency substream component for a given chunk of a given video frame, but receiver 110 receives the motion estimation data of this lowest frequency substream component, receiver 110 utilizes the motion estimation data to reconstruct the given chunk by extrapolating from the corresponding chunk in a previous video frame. This allows receiver 110 to reconstruct the given chunk, albeit at a lower quality. However, since a new frame will be displayed shortly after the current frame, the user is unlikely to notice any artifacts from the lower quality chunk. Reconstructing the given chunk is a better solution than leaving the given chunk blank, which would cause a more noticeable flaw in the video frame displayed to the user. As used herein, the term "extrapolate" is defined as extending a range of values by inferring unknown values from trends in the known data.

In one embodiment, if the motion estimation data is lost, receiver 110 performs a motion vector flow extrapolation. For example, if receiver 110 receives motion estimation data for the previous two frames, and if the flow moves in a certain direction, receiver 110 extrapolates along the detected direction to regenerate the lost motion estimation data of the current frame. In this example, receiver 110 predicts that the next motion vector will be in the same direction as the previous motion vectors. Then, receiver 110 can recover the low frequency substream component from the regenerated motion estimation data.

In another embodiment, if one wireless packet is lost, this typically corresponds to a small portion of a video frame. In this embodiment, when a small portion of the video frame is lost, receiver 110 reconstructs this portion of the video frame. When reconstructing a lost chunk of the frame, that piece does not necessarily need to be reconstructed at a high resolution. This low resolution reconstruction will typically not generate a noticeable flaw or artifact for the user. But if the chunk is lost and is displayed using a black box, then the user will likely notice this flaw in the video frame. If a low frequency component of a chunk of the video frame is received, and if the high resolution components surrounding that small piece are received, then receiver 110 can extrapolate using the neighboring high resolution components as well as the low resolution component of the lost chunk to regenerate the lost high resolution component.

Figure 2:
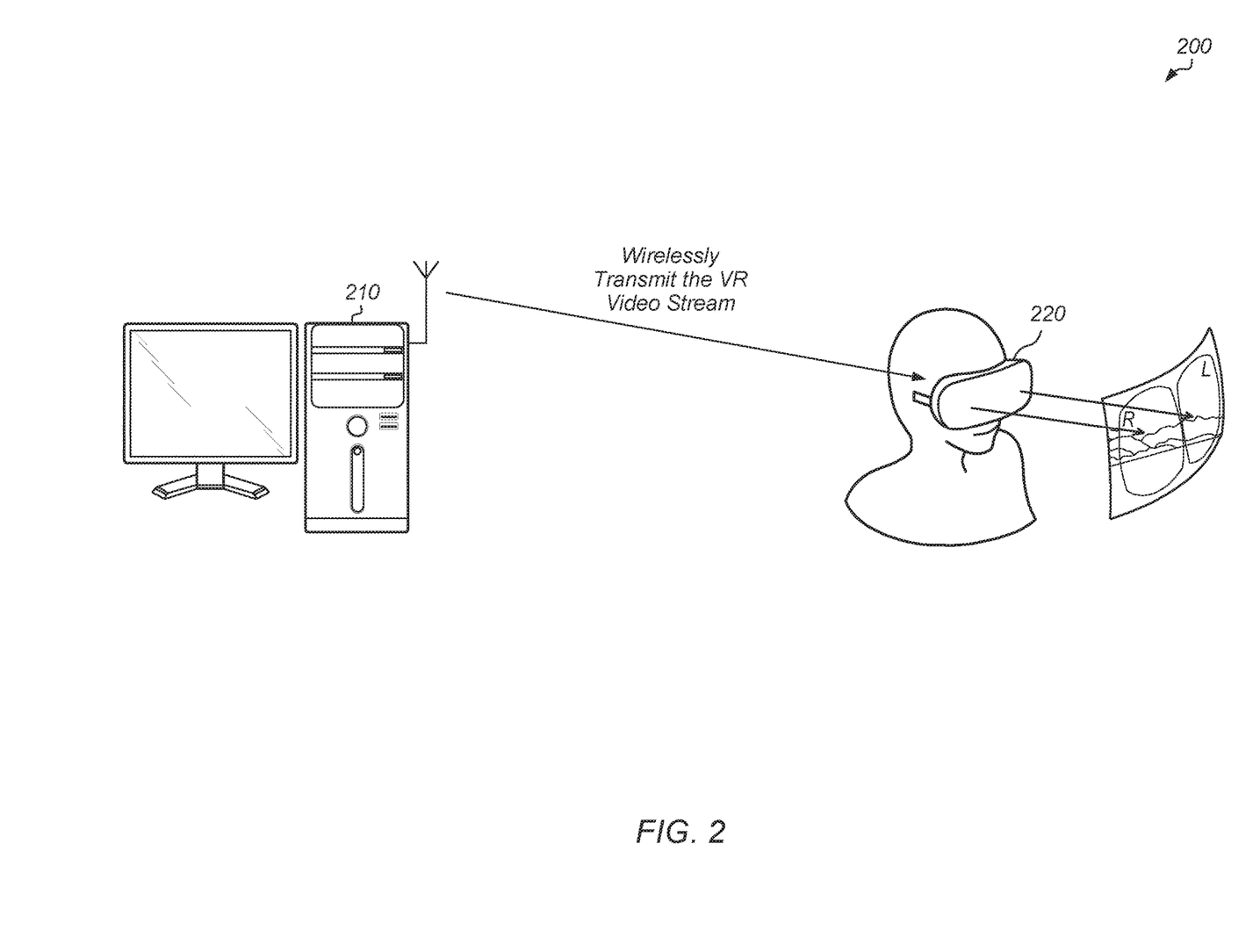
FIG. 2 is a block diagram of one embodiment of a wireless virtual reality (VR) system.

Turning now to FIG. 2, a block diagram of one embodiment of a wireless virtual reality (VR) system 200 is shown. System 200 includes at least computer 210 and head-mounted display (HMD) 220. Computer 210 is representative of any type of computing device which includes one or more processors, memory devices, input/output (I/O) devices, RF components, antennas, and other components indicative of a personal computer or other computing device. In other embodiments, other computing devices, besides a personal computer, can be utilized to send video data wirelessly to head-mounted display (HMD) 220. For example, computer 210 can be a gaming console, smart phone, set top box, television set, video streaming device, wearable device, a component of a theme park amusement ride, or otherwise.

Computer 210 and HMD 220 each include circuitry and/or components to communicate wirelessly. It should be understood that while computer 210 is shown as having an external antenna, this is shown merely to illustrate that the video data is being sent wirelessly. It should be understood that computer 210 can have an antenna which is inside the external case of computer 210. Additionally, while computer 210 can be powered using a wired power connection, HMD 220 is typically battery powered. Alternatively, computer 210 can be a laptop computer powered by a battery.

In one embodiment, computer 210 includes circuitry configured to dynamically render a representation of a VR environment to be presented to a user wearing HMD 220. For example, in one embodiment, computer 210 includes one or more graphics processing units (GPUs) to render a VR environment. In other embodiments, computer 210 can include other types of processors, including a central processing unit (CPU), application specific integrated circuit (ASIC), field programmable gate array (FPGA), digital signal processor (DSP), or other processor types. HMD 220 includes circuitry to receive and decode a compressed bit stream sent by computer 210 to generate frames of the rendered VR environment. HMD 220 then drives the generated frames to the display integrated within HMD 220.

After rendering a frame of a virtual environment video stream, a video encoder of computer 210 splits the rendered frame into N components. Each of the N components can then be sent separately to HMD 220. Each of the N components represents the video at a different frequency, bitrate, quality, and/or resolution. In one embodiment, each rendered frame is processed multiple times to produce separate lower quality/bitrate and higher quality/bitrate streams, with the higher-quality stream being a derivation of the lower-quality stream. The process is a successive approximation which is not limited to two streams of lower/higher-quality but can also be used to generate N streams of different qualities/bitrates. In one embodiment, the rendered frames are processed with a first compression ratio to produce a lower bitrate stream. In this embodiment, a higher bitrate stream is generated from the delta of the lower bitrate stream and the original stream at a second lower compression ratio.

In one embodiment, the video encoder splits a rendered video frame into a plurality of components based on frequency. Then, the video encoder generates motion estimation data (e.g., motion vector fields) from a lowest frequency component of the video frame. A media access control (MAC) layer unit then selects a robust modulation coding scheme (MCS) level for modulating and sending the motion estimation data over the wireless link to HMD 220. It is noted that a "MCS level" can also be referred to as a "MCS index".

For example, in one embodiment, the motion estimation data is modulated and sent to HMD 220 using MCS level 0. MCS level 0 uses binary phase shift keying (BPSK) to encode a single bit per symbol and is a robust modulation since it takes a higher amount of noise or distortion to make the demodulator reach an incorrect decision as compared to a less reliable MCS. MCS level 0 offers protection against channel errors at the expense of a lower transmission rate. Other MCS levels utilize other types of modulation. For example, MCS level 2 uses quadrature phase shift keying (QPSK) modulation, MCS level 4 uses 16 quadrature amplitude modulation (QAM), and MCS level 7 uses 64-QAM. Generally speaking, as the MCS level increases, the bit rate increases while the resiliency of the signal decreases. In other words, higher resilience and lower data rates are achieved with relatively low MCS levels while lower resilience and higher data rates are achieved with relatively high MCS levels.

In one embodiment, if HMD 220 does not receive the lowest frequency substream component for a given chunk of a given video frame, but HMD 220 receives the motion estimation data of this lowest frequency substream component, HMD 220 utilizes the motion estimation data to reconstruct the given chunk by extrapolating from the corresponding chunk in a previous video frame. This allows HMD 220 to reconstruct the given chunk, albeit at a lower quality. However, the user is unlikely to notice any artifacts from the lower quality chunk since a new frame will be displayed shortly thereafter. Reconstructing the given chunk is a better solution than leaving the given chunk blank, which would cause a more noticeable flaw in the video frame displayed to the user.

Figure 3:
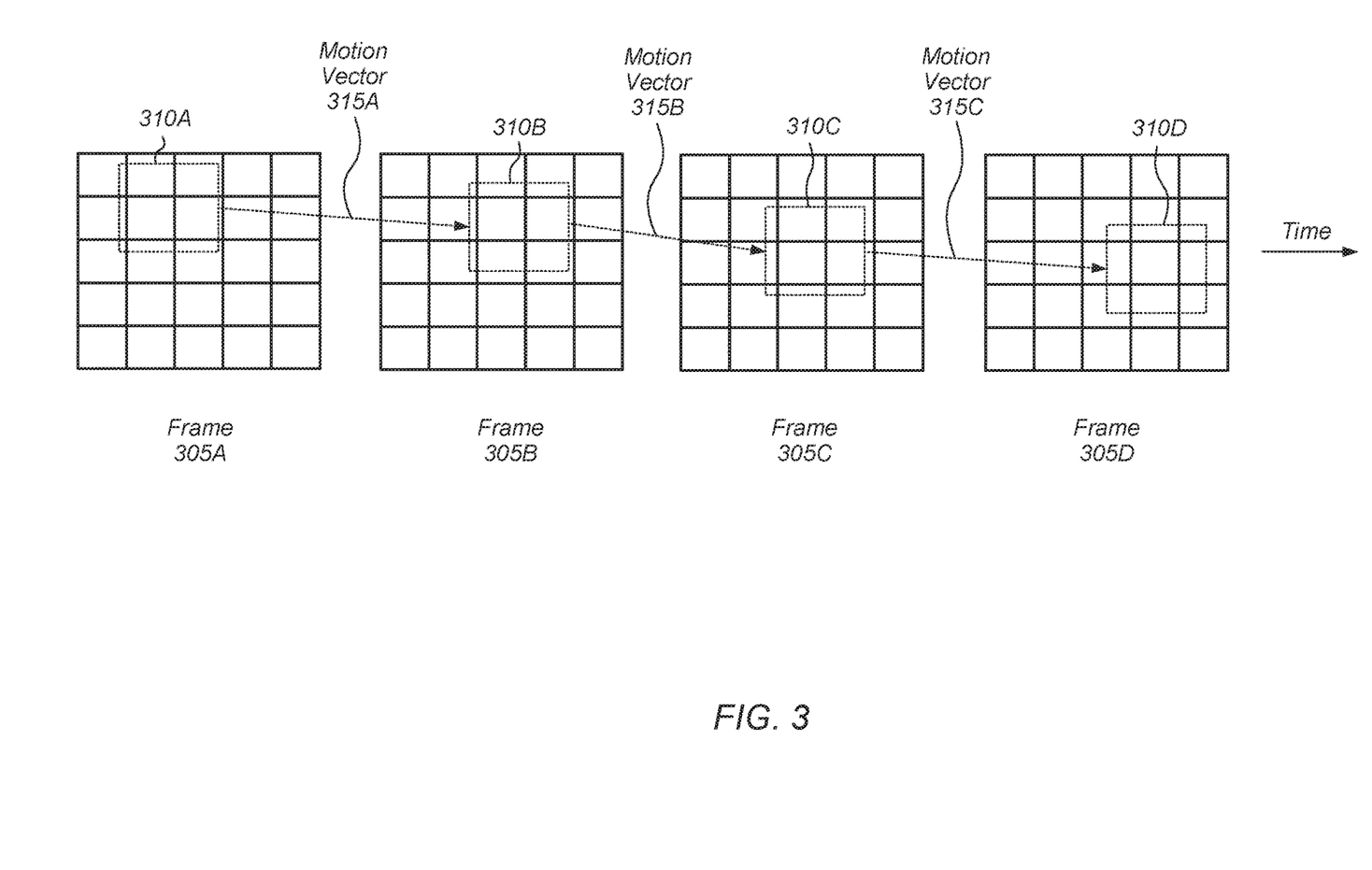
FIG. 3 is a block diagram of one embodiment of a set of motion vectors for a sequence of video frames.

Referring now to FIG. 3, a block diagram of one embodiment of a set of motion vectors 315A-C for a sequence of video frames 305A-D is shown. Frames 305A-D represent consecutive frames of a video sequence. Box 310A represents an individual block of pixels within frame 305A. Box 310A can also be referred to as a macroblock. The arrow 315A represents the known motion of the imagery within box 310A as the video sequence moves from frame 305A to 305B. The known motion illustrated by arrow 315A can be defined by a motion vector. It is noted that although motion vectors 315A-C point in the direction of motion of box 310 in subsequent frames, in another embodiment, a motion vector can be defined to point in a direction opposite to the motion of the imagery. For example, in some compression standards, a motion vector associated with a macroblock points to the source of that block in the reference frame.

In one embodiment, boxes 310B-D can be tracked in subsequent frames using motion vectors 315A-C. For example, the motion vector 315A indicates the change in position of box 310B in frame 305B as compared to box 310A in frame 305A. Similarly, motion vector 315B indicates the change in location of box 310C in frame 310C as compared to box 310B in frame 305B. Also, motion vector 315C indicates the change in location of box 310D in frame 310D as compared to box 310C in frame 305C. In another embodiment, a motion vector can be defined to track the reverse motion of a block from a given frame back to the previous frame.

If a receiver (e.g., HMD 220 of FIG. 2) does not receive a given motion vector component (e.g., motion vector 315C), the receiver is configured to perform a motion vector flow extrapolation to regenerate the lost motion vector component. For example, if the receiver receives motion vectors 315A-B, and if the flow moves in a certain direction, the receiver extrapolates along the detected direction to regenerate the lost motion vector component 315C. Accordingly, the receiver predicts that the motion vector component 315C will be in the same direction as the previous motion vector components 315A-B. Then, the receiver can recover the low frequency substream component for frame 305D from the regenerated motion vector component 315C.

Figure 4:
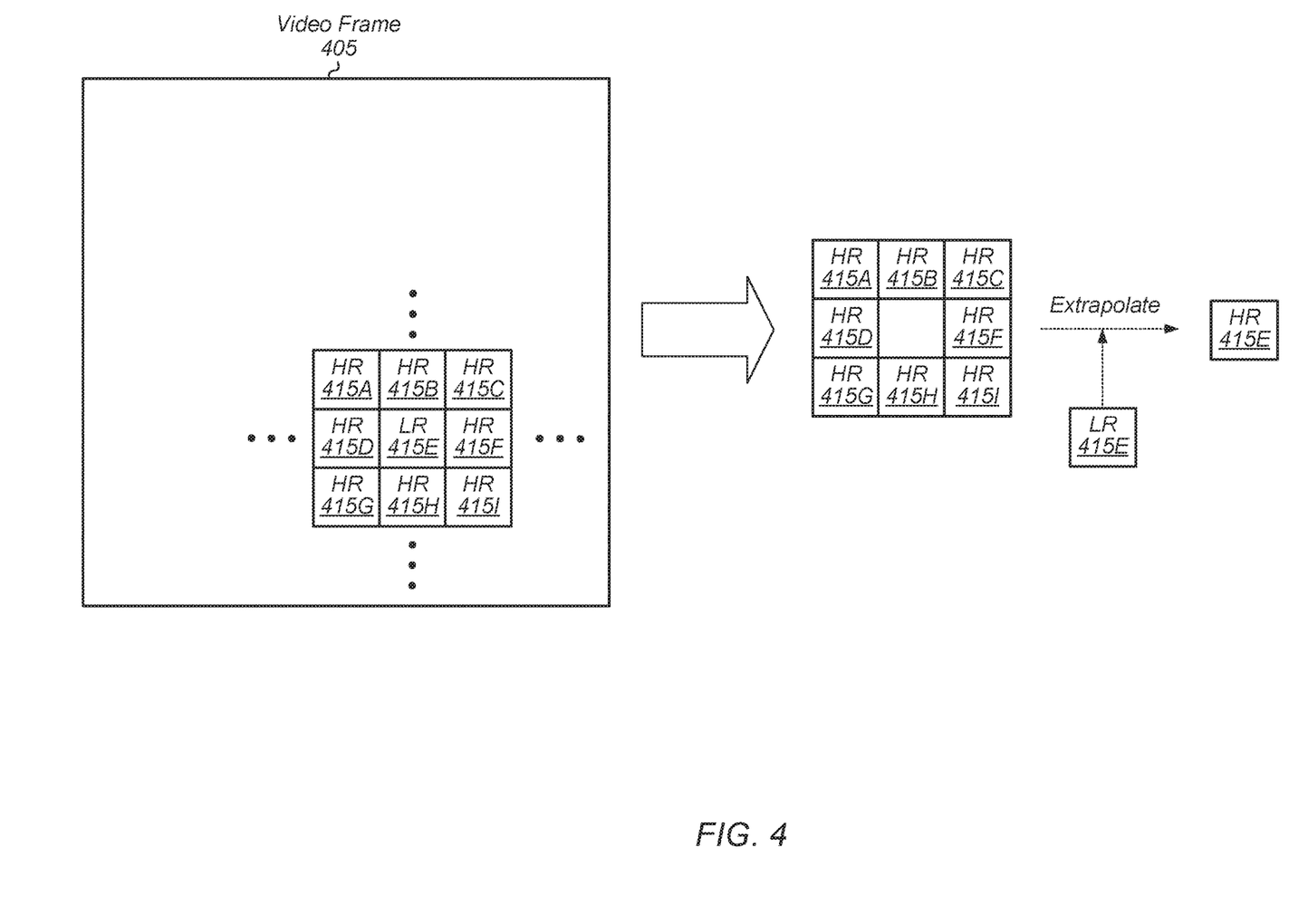
FIG. 4 is a block diagram of one embodiment of extrapolating a high resolution version of a lost portion of a video frame from neighboring portions.

Turning now to FIG. 4, a block diagram of one embodiment of extrapolating a high resolution version of a lost portion of a video frame 405 from neighboring portions is shown. In one embodiment, video frame 405 represents a video frame sent wirelessly over a wireless link from a transmitter to a receiver (e.g., HMD). In one embodiment, video frame 405 is sent a portion at a time from the transmitter to the receiver. A small region of video frame 405 is illustrated in FIG. 4, with the small region made up of the portions 415A-I, each of which is sent separately from the transmitter to the receiver. In one embodiment, each portion 415A-I of received video frame 405 is split into multiple substream components and each substream component is sent separately to the receiver. For example, in one embodiment, each portion 415A-I is split into a high resolution (HR) component and a low resolution (LR) component, and the HR and LR component are sent separately to the receiver. It is noted that the HR component can also be referred to as a high frequency component and the LR component can also be referred to as a low frequency component. In other embodiments, each portion 415A-I can be split into other numbers of substream components that represent different frequency ranges of the original portion. If the HR component of a given portion is not received, then the receiver is configured to reconstruct the HR component of the given portion by extrapolating from the HR components of the neighboring portions.

The HR labels for portions 415A-D and portions 415F-I indicate that the high resolution component was received for these portions of video frame 405. The label LR for portion 415E indicates that only the low resolution component was received for this portion of video frame 405. Accordingly, based on the high resolution component not being received for portion 415E, the receiver is configured to reconstruct the HR component of the portion 415E by extrapolating from the HR components of the neighboring portions 415A-D and 415F-I.

Figure 5:
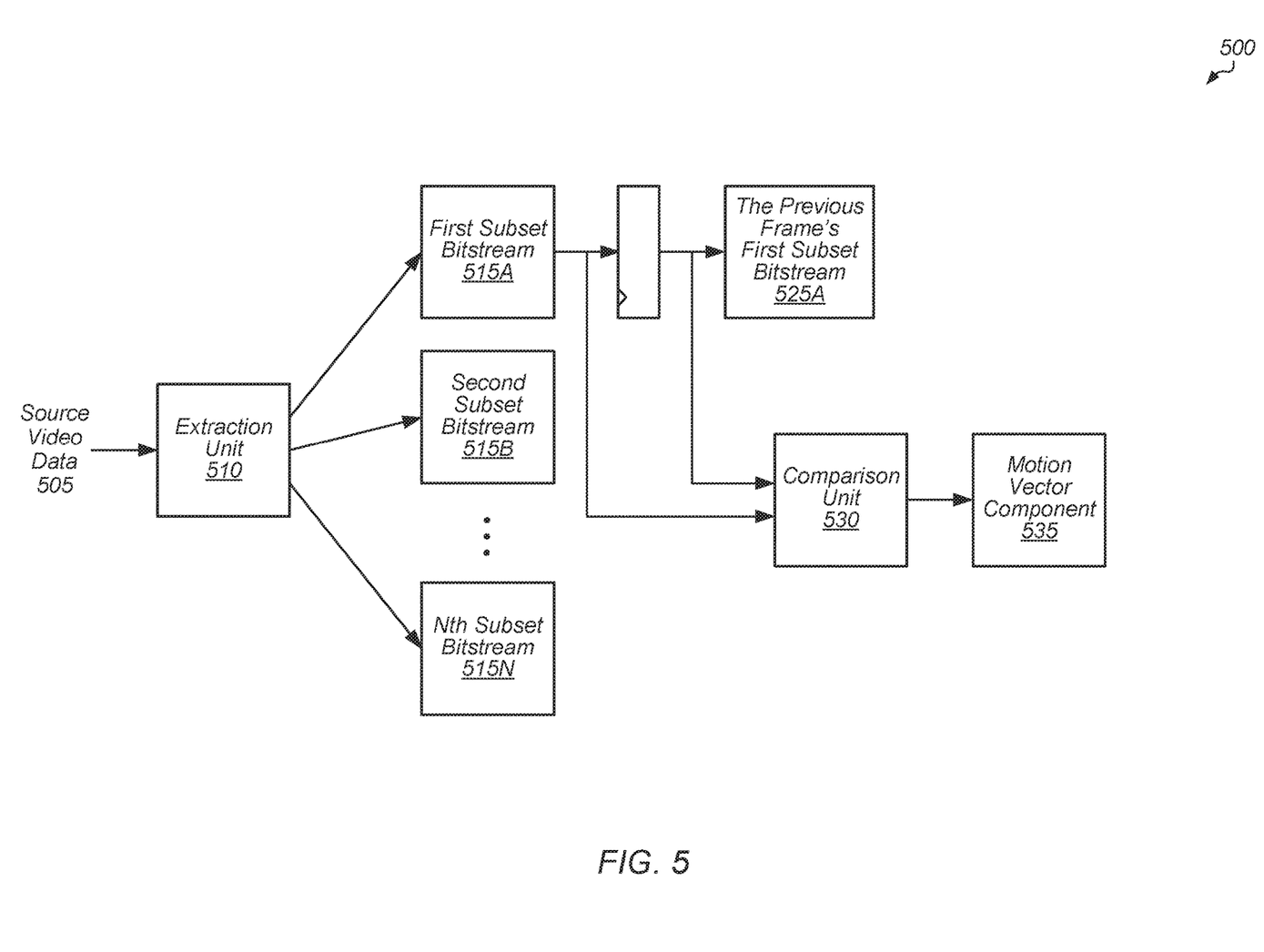
FIG. 5 is a block diagram of one embodiment of logic for generating a motion vector component from a low frequency substream component of a video stream.

Referring now to FIG. 5, a block diagram of one embodiment of logic 500 for generating a motion vector component from a low frequency substream component of a video stream is shown. In one embodiment, a video encoder (i.e., codec) of a transmitter (e.g., computer 210 of FIG. 2) receives source video data 505 and extraction unit 510 splits the source video data 505 into multiple subset bitstreams 515A-N. The number of subset bitstreams 515A-N can vary from embodiment to embodiment. The different subset bitstreams 515A-N are sent separately from the transmitter to the receiver. First subset bitstream 515A includes the low frequency components of the video frame. It is noted that the low frequency components of the video frame can also be referred to as the low resolution components of the video frame.

In one embodiment, the first subset bitstream 515A and first subset bitstream 525A of consecutive video frames are analyzed. For example, the previous frame's first subset bitstream 525A and the current frame's first subset bitstream 515A are provided to comparison unit 530. In other embodiments, the first subset bitstream for multiple previous frames can be provided to comparison unit 530. Comparison unit 530 is configured to generate motion vector component 535 based on a comparison of back-to-back first subset bitstreams 525A and 515A. This motion vector component 535 is then sent to a receiver using a low, robust MCS level (e.g., MCS level 0). By sending motion vector component 535 with a low, robust MCS level, the transmitter is increasing the probability that motion vector component 535 will be received by the receiver even during challenging link conditions. If the receiver doesn't receive any of the subset bitstreams 515A-N for a given frame, but the receiver receives the motion vector component 535 of the low frequency component of the given frame, the receiver reconstructs the low frequency component of the given frame from the motion vector component 535.

Figure 6:
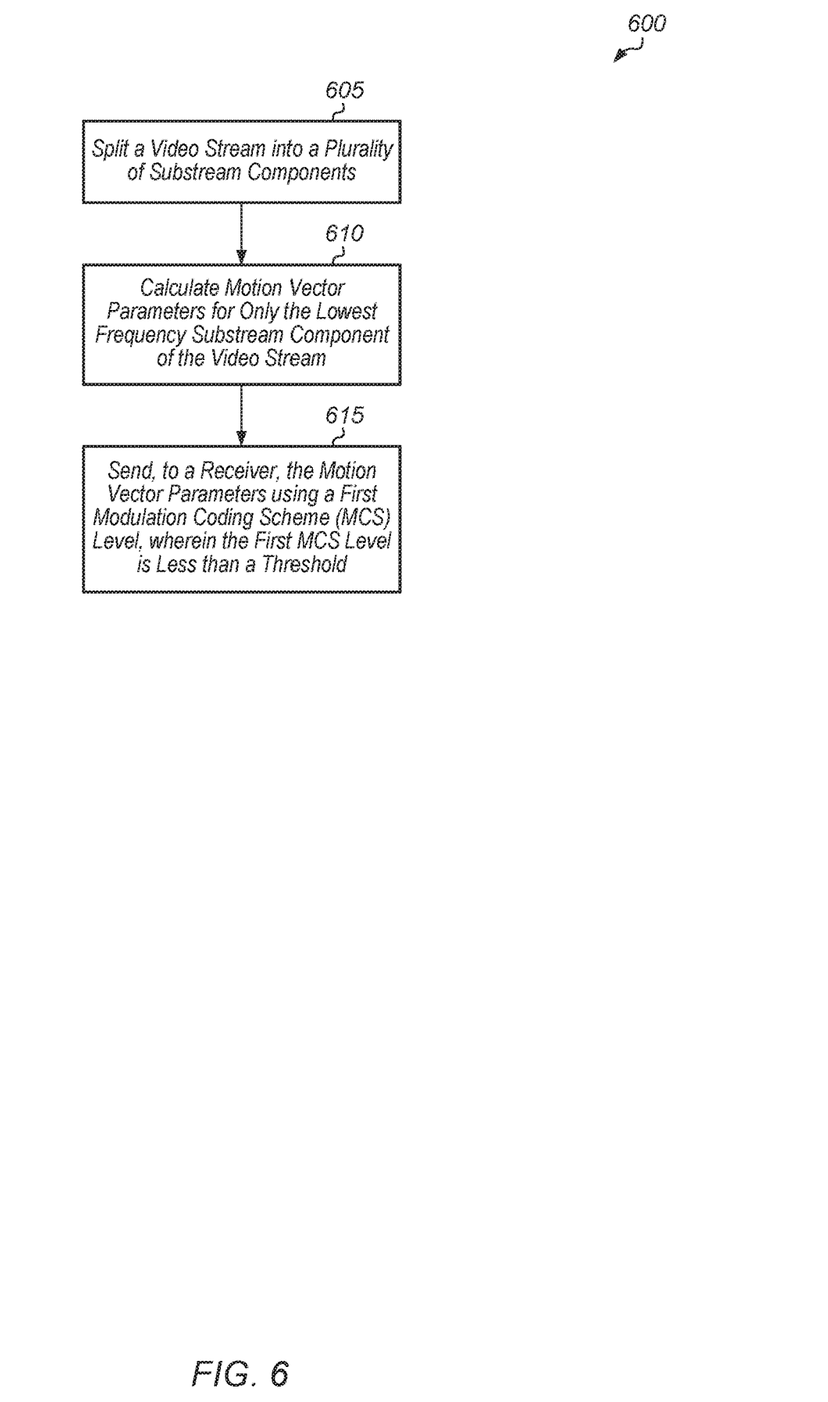
FIG. 6 is a generalized flow diagram illustrating one embodiment of a method for calculating and transmitting motion vector parameters for the low frequency component of a video stream.

Turning now to FIG. 6, one embodiment of a method 600 for calculating and transmitting motion vector parameters for the low frequency component of a video stream is shown. For purposes of discussion, the steps in this embodiment and those of FIG. 7-10 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 600.

A transmitter splits a video stream into a plurality of substream components (block 605). For example, the transmitter splits the video stream into N substream components, with a first sub stream component including the highest frequency components of the video stream, a second substream component including the next highest range of frequency components, and so on, with the Nth sub stream component including the lowest frequency components of the video stream. Next, the transmitter calculates motion vector parameters for only the lowest frequency substream component of the video stream (block 610). The motion vector parameters can include a global motion vector and/or local motion vectors associated with portions of the lowest frequency substream component. Then, the transmitter sends, to a receiver, the motion vector parameters using a first modulation coding scheme (MCS) level, wherein the first MCS level is less than a threshold (block 615). In one embodiment, the threshold is one, and the transmitter sends the motion vector using MCS level 0. In other embodiments, the threshold can be other values. By sending the motion vector using a low MCS level, the transmitter is increasing the likelihood of the motion vector being received by the receiver. After block 615, method 600 ends.

Figure 7:
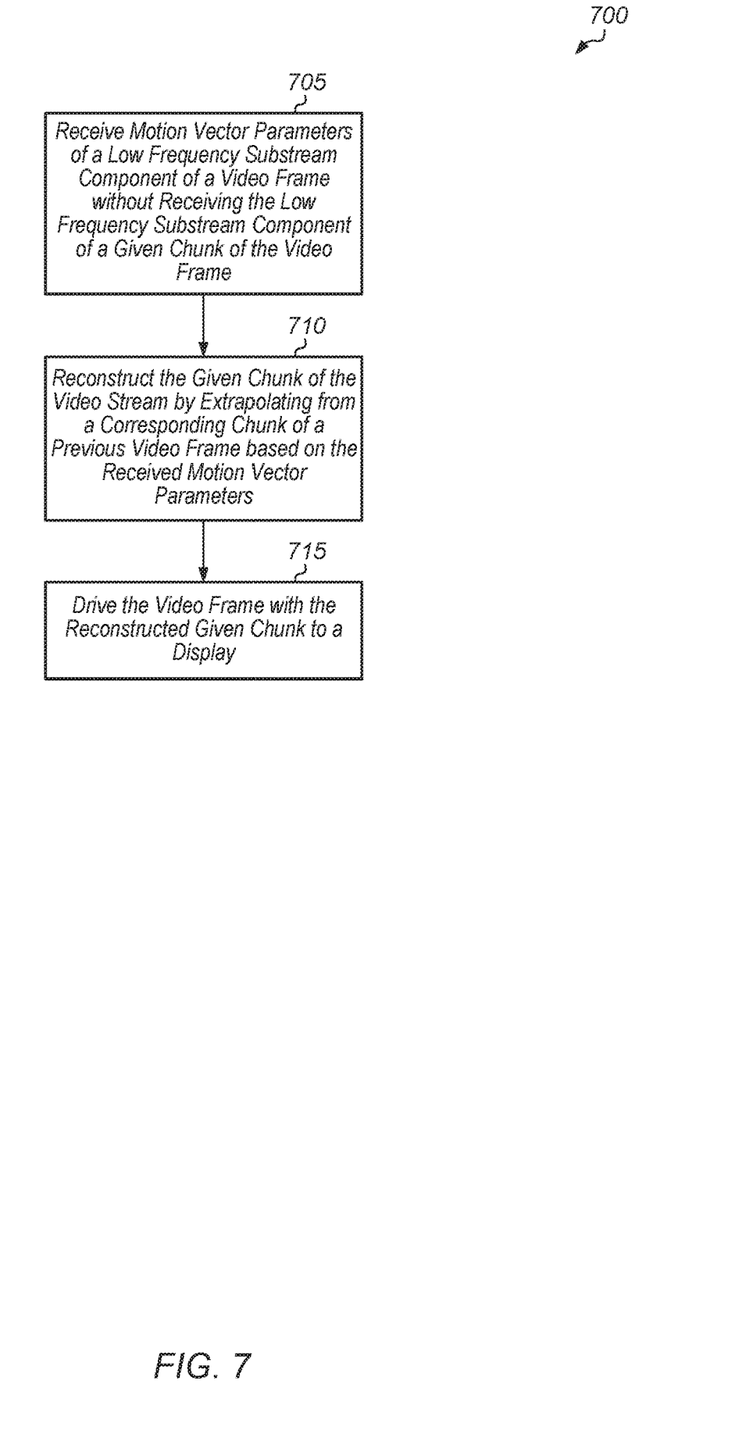
FIG. 7 is a generalized flow diagram illustrating one embodiment of a method for reconstructing a lost chunk of a video frame using motion vector parameters of the low frequency substream component of the video frame.

Referring now to FIG. 7, one embodiment of a method 700 for reconstructing a lost chunk of a video frame using motion vector parameters of the low frequency sub stream component of the video frame is shown. A receiver receives motion vector parameters of a low frequency substream component of a video frame without receiving the low frequency substream component of a given chunk of the video frame (block 705). Rather than requesting that the low frequency component of the given chunk be resent, the receiver reconstructs the given chunk of the video stream by extrapolating from a corresponding chunk of a previous video frame based on the received motion vector parameters (block 710). If the receiver requests that the given chunk be resent, the latency involved in sending the request and waiting for reception of the given chunk would likely result in the given chunk being unusable since a new frame would probably be displayed in that time. Then, the receiver drives the video frame with the reconstructed given chunk to a display (block 715). After block 715, method 700 ends. By reconstructing the given chunk using the motion vector parameters, the receiver is able to display a reconstructed version of the given chunk of the video frame while meeting latency requirements.

Figure 8:
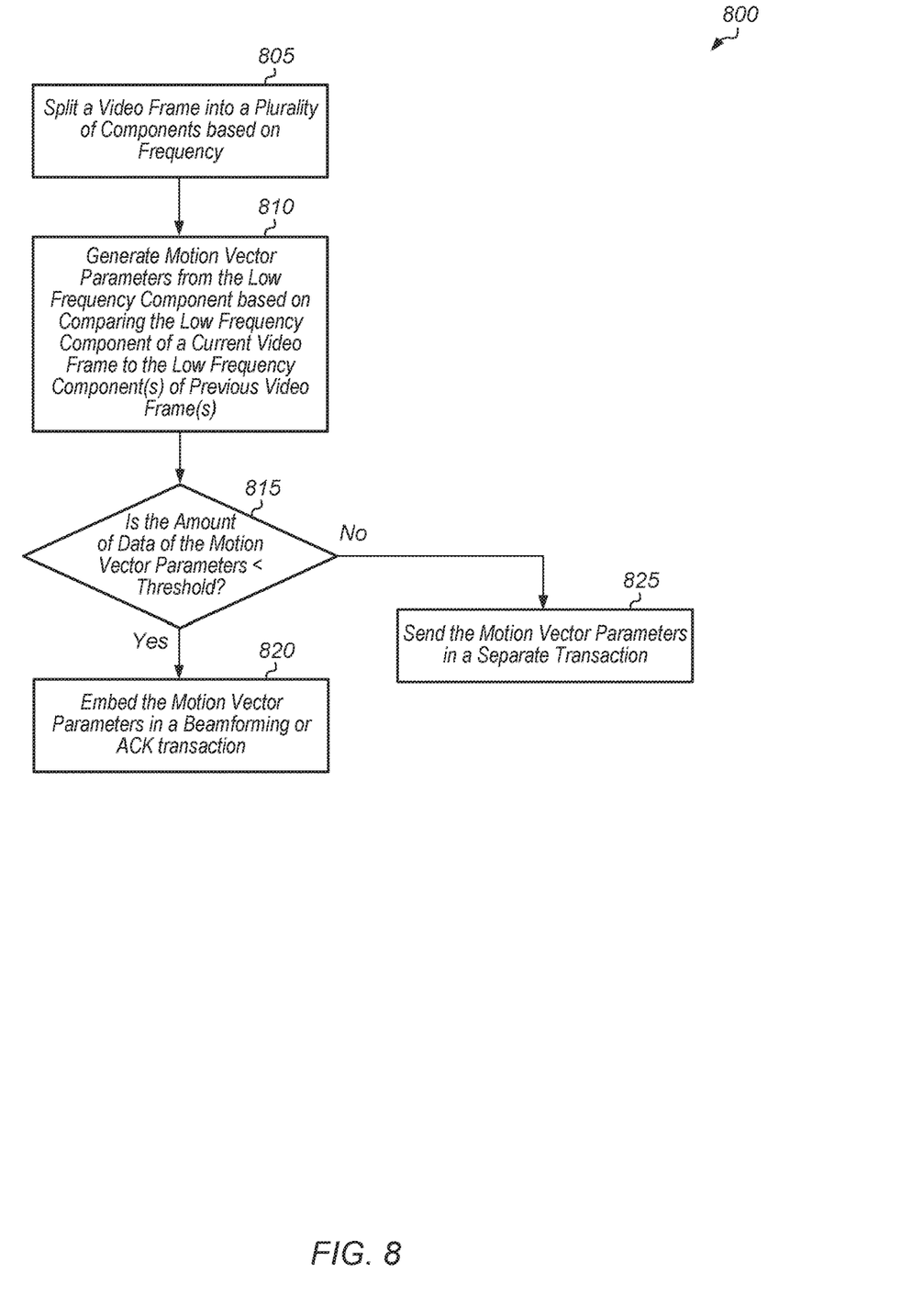
FIG. 8 is a generalized flow diagram illustrating one embodiment of a method for embedding motion vector parameters of the low frequency substream component of the video frame in a beamforming or ACK transaction.

Turning now to FIG. 8, one embodiment of a method 800 for embedding motion vector parameters of the low frequency substream component of the video frame in a beamforming or ACK transaction is shown. A transmitter splits a video frame into a plurality of components based on frequency (block 805). Next, the transmitter generates motion vector parameters from the low frequency component based on comparing the low frequency component of a current video frame to the low frequency component(s) of previous video frame(s) (block 810). Then, if the amount of data of the motion vector parameters is less than a threshold (conditional block 815, "yes" leg), the transmitter embeds the motion vector parameters in a beamforming or acknowledgement (ACK) transaction (block 820). If the amount of data of the motion vector parameters is greater than or equal to the threshold (conditional block 815, "no" leg), then the transmitter sends the motion vector parameters in a separate transaction (block 825). After blocks 820 and 825, method 800 ends. It is noted that method 800 can be repeated for each frame of a video sequence.

Figure 9:
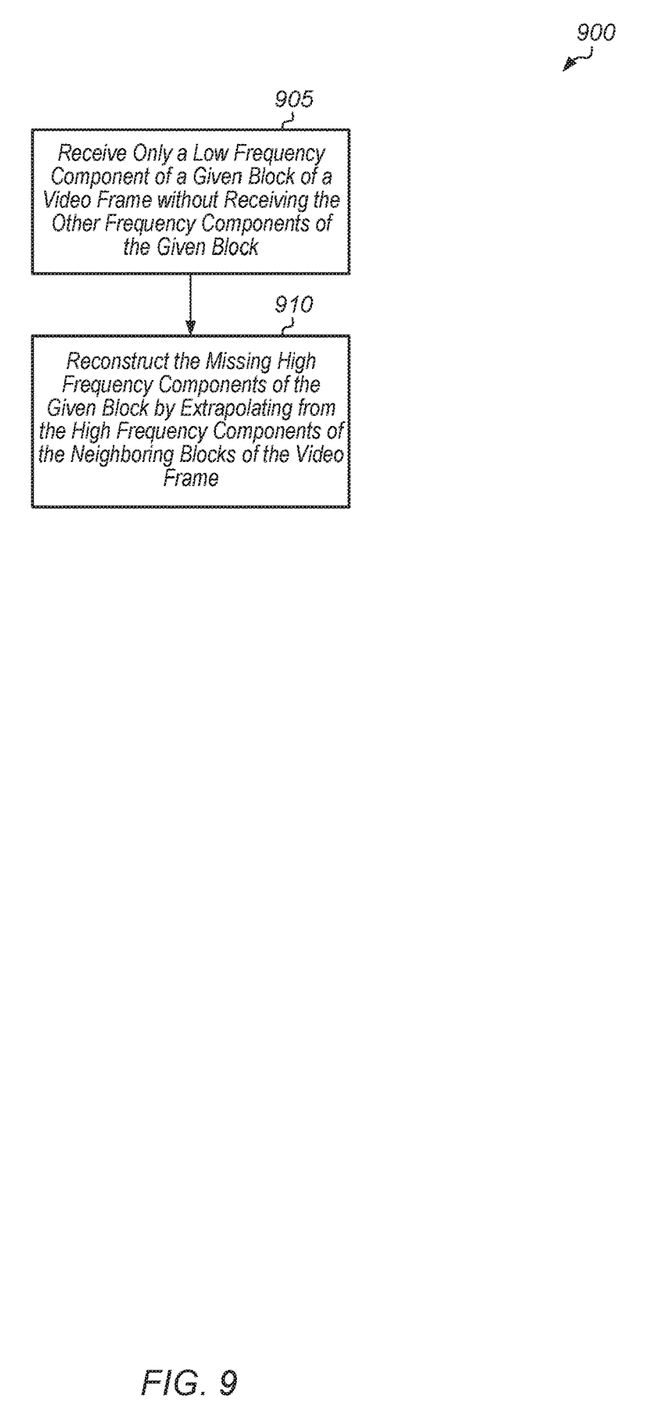
FIG. 9 is a generalized flow diagram illustrating one embodiment of a method for reconstructing a high frequency component of a block of a video frame from neighboring blocks.

Referring now to FIG. 9, one embodiment of a method 900 for reconstructing a high frequency component of a block of a video frame from neighboring blocks is shown. A receiver receives only a low frequency component of a given block of a video frame without receiving the other frequency components of the given block (block 905). The receiver reconstructs the missing high frequency components of the given block by extrapolating from the high frequency components of the neighboring blocks of the video frame (block 910). After block 910, method 900 ends.

Figure 10:
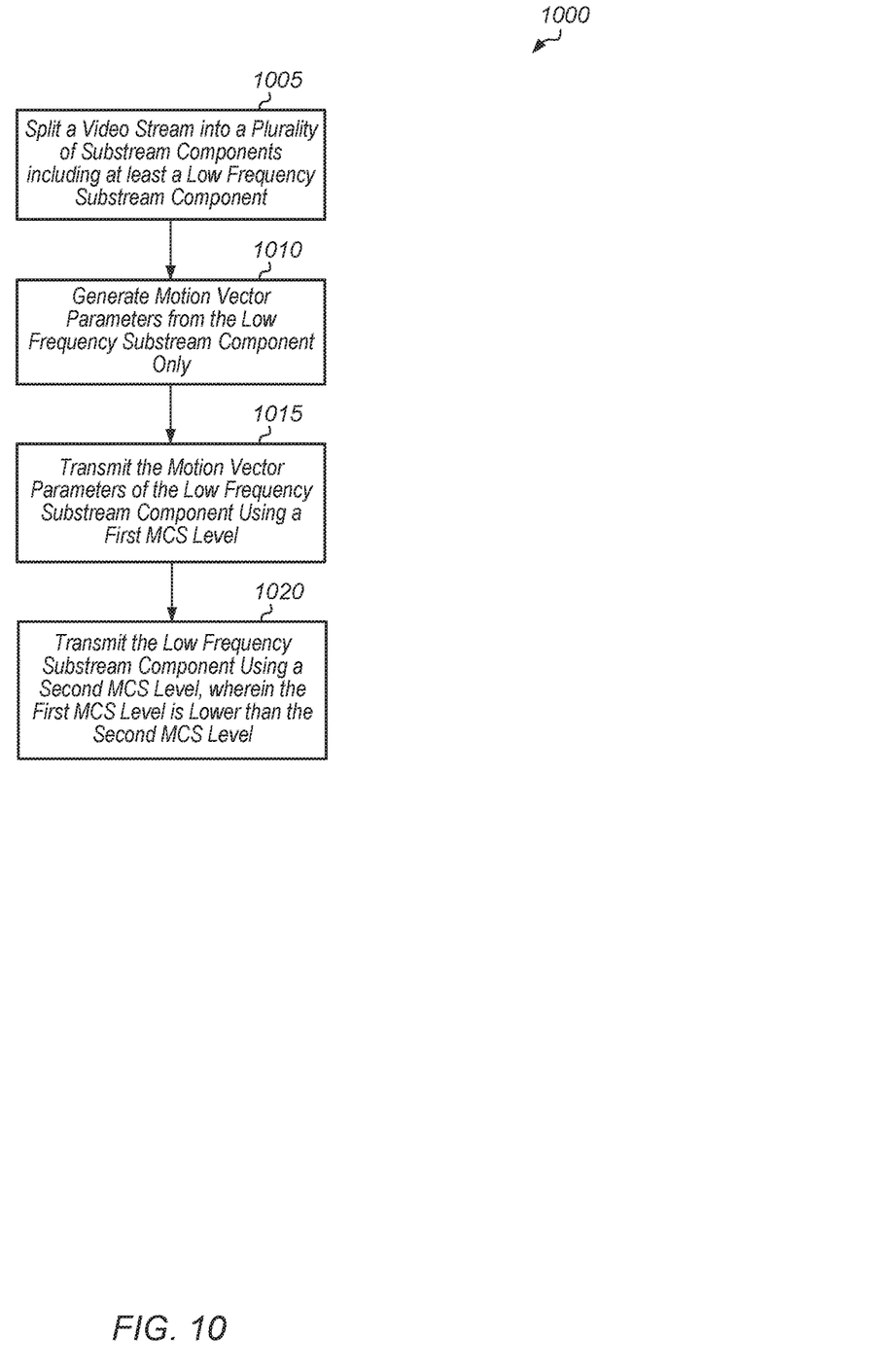
FIG. 10 is a generalized flow diagram illustrating one embodiment of a method for selecting MCS levels for transmitting a video stream.

Turning now to FIG. 10, one embodiment of a method 1000 for selecting MCS levels for transmitting a video stream is shown. A video encoder splits a video stream into a plurality of substream components including at least a low frequency substream component (block 1005). The video encoder generates motion vector parameters from the low frequency substream component only (block 1010). The transmitter transmits the motion vector parameters of the low frequency substream component using a first MCS level (block 1015). In one embodiment, the first MCS level is MCS level 0. By transmitting the motion vector using a low, robust MCS level, the transmitter increases the likelihood that the motion vector parameters of the low frequency substream component will be received by the receiver. Also, the transmitter transmits the low frequency substream component using a second MCS level, wherein the first MCS level is lower than the second MCS level (block 1020). After block 1020, method 1000 ends. It is noted that the transmitter can also send other substream components with different MCS levels using any suitable scheme for mapping substream components to appropriate MCS levels based on the desired level of robustness.

In various embodiments, program instructions of a software application are used to implement the methods and/or mechanisms described herein. For example, program instructions executable by a general or special purpose processor are contemplated. In various embodiments, such program instructions can be represented by a high level programming language. In other embodiments, the program instructions can be compiled from a high level programming language to a binary, intermediate, or other form. Alternatively, program instructions can be written that describe the behavior or design of hardware. Such program instructions can be represented by a high-level programming language, such as C. Alternatively, a hardware design language (HDL) such as Verilog can be used. In various embodiments, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
   a transmitter; and
   a receiver;
   wherein the transmitter is configured to:
   partition a video stream into a plurality of substream components, wherein:
   each of the plurality of substream components corresponds to a different frequency range of the video stream; and
   each of the higher frequency substream components of the plurality of substream components are dependent on each of the lower frequency substream components of the plurality of substream components to be successfully decoded;
   calculate motion vector parameters for a lowest frequency substream component of the plurality of substream components of the video stream; and
   send, to the receiver, embedded in one of a beamforming transaction and an acknowledgement transaction, the motion vector parameters with a first modulation coding scheme (MCS) level, wherein the first MCS level is less than a first threshold.

2. The system as recited in claim 1, wherein responsive to not receiving a given lowest frequency substream component for a given chunk of a video frame, the receiver is configured to reconstruct the given lowest frequency substream component of the given chunk by extrapolating from a lowest frequency substream component of a corresponding chunk of a previous video frame based on received motion vector parameters.

3. The system as recited in claim 1, wherein the transmitter is further configured to:
   send the lowest frequency substream component with a second MCS level; and
   select the first MCS level such that it is lower than the second MCS level.

4. The system as recited in claim 1, wherein responsive to not receiving a given set of motion vector parameters, the receiver is configured to regenerate the given set of motion vector parameters by extrapolating from one or more sets of previous motion vector parameters.

5. The system as recited in claim 1, wherein the transmitter is configured to calculate the motion vector parameters for only the lowest frequency substream component of the plurality of substream components of the video stream.

6. The system as recited in claim 1, wherein the higher frequency substream components represent incremental quality enhancements to a quality of the lower frequency substream components.

7. A method comprising:
   partitioning a video stream into a plurality of substream components, wherein:
   each of the plurality of substream components corresponds to different frequency range of the video stream; and
   each of the higher frequency substream components of the plurality of substream components are dependent on each of the lower frequency substream components of the plurality of substream components to be successfully decoded;
   calculating motion vector parameters for a lowest frequency substream component of the plurality of substream components of the video stream; and
   sending, to a receiver, embedded in one of a beamforming transaction and an acknowledgement transaction, the motion vector parameters with a first modulation coding scheme (MCS) level, wherein the first MCS level is less than a first threshold.

8. The method as recited in claim 7, wherein responsive to not receiving a given lowest frequency substream component for a given chunk of a video frame, the method further comprising reconstructing the given lowest frequency substream component of the given chunk by extrapolating from a lowest frequency substream component of a corresponding chunk of a previous video frame based on received motion vector parameters.

9. The method as recited in claim 7, further comprising:
   sending the lowest frequency sub stream component with a second MCS level; and
   select the first MCS level such that it is lower than the second MCS level.

10. The method as recited in claim 7, wherein responsive to not receiving a given set of motion vector parameters, the method further comprising regenerating the given set of motion vector parameters by extrapolating from one or more sets of previous motion vector parameters.

11. The method as recited in claim 7, further comprising calculating the motion vector parameters for only the lowest frequency substream component of the plurality of substream components of the video stream.

12. The method as recited in claim 7, wherein the higher frequency substream components represent incremental quality enhancements to a quality of the lower frequency sub stream components.

13. A transmitter comprising:
a processing unit; and
a memory;
wherein the transmitter is configured to:
partition a video stream into a plurality of substream components, wherein:
each of the plurality of substream components corresponds to different frequency range of the video stream; and
each of the higher frequency substream components of the plurality of substream components are dependent on each of the lower frequency substream components of the plurality of substream components to be successfully decoded;
calculate motion vector parameters for a lowest frequency substream component of the plurality of substream components of the video stream; and
send, to a receiver, embedded in one of a beamforming transaction and an acknowledgement transaction, the motion vector parameters with a first modulation coding scheme (MCS) level, wherein the first MCS level is less than a first threshold.

14. The transmitter as recited in claim 13, wherein the transmitter is configured to:
send the lowest frequency substream component with a second MCS level; and
select the first MCS level such that it is lower than the second MCS level.

15. The transmitter as recited in claim 14, wherein the first MCS level is zero.

16. The transmitter as recited in claim 13, wherein the transmitter is configured to calculate the motion vector parameters for only the lowest frequency substream component of the plurality of substream components of the video stream.

17. The transmitter as recited in claim 13, wherein the higher frequency substream components represent incremental quality enhancements to a quality of the lower frequency sub stream components.

* * * * *

UNITED STATES PATENT AND TRADEMARK OFFICE
CERTIFICATE OF CORRECTION

PATENT NO. : 10,938,503 B2  
APPLICATION NO. : 15/852833  
DATED : March 2, 2021  
INVENTOR(S) : Vu Page 1 of 1

It is certified that error appears in the above-identified patent and that said Letters Patent is hereby corrected as shown below:

In the Specification

Column 9, Line 58, please delete "sub stream" and substitute -- substream --.

Column 9, Line 61, please delete "sub stream" and substitute -- substream --.

Column 10, Line 13, please delete "sub stream" and substitute -- substream --.

In the Claims

Column 12, Claim 9, Line 59, please delete "sub stream" and substitute -- substream --.

Column 13, Claim 12, Lines 7-8, please delete "sub stream" and substitute -- substream --.

Column 14, Claim 17, Line 23, please delete "sub stream" and substitute -- substream --.

Signed and Sealed this  
Fifth Day of October, 2021

Drew Hirshfeld  
*Performing the Functions and Duties of the*  
*Under Secretary of Commerce for Intellectual Property and*  
*Director of the United States Patent and Trademark Office*